United States Patent
Vipond et al.

(10) Patent No.: US 9,119,069 B1
(45) Date of Patent: Aug. 25, 2015

(54) NEAR FIELD COMMUNICATION BASED AUTHENTICATION

(71) Applicant: EMC Corporation, Hopkinton, MA (US)

(72) Inventors: Edward W. Vipond, Gardner, MA (US); Yong Qiao, Acton, MA (US); Karl Ackerman, Topsfield, MA (US); Marco Ciaffi, Sudbury, MA (US); Daniel Wilder, Derry, NH (US)

(73) Assignee: EMC Corporation, Hopkinton, MA (US)

( * ) Notice: Subject to any disclaimer, the term of this patent is extended or adjusted under 35 U.S.C. 154(b) by 246 days.

(21) Appl. No.: 13/829,037

(22) Filed: Mar. 14, 2013

(51) Int. Cl.
*G06F 21/00* (2013.01)
*H04W 12/06* (2009.01)

(52) U.S. Cl.
CPC ...................................... *H04W 12/06* (2013.01)

(58) Field of Classification Search
CPC ....... G06F 21/34; G06F 21/41; G06F 21/445; H04L 63/08; H04W 12/06
USPC ............................... 713/185–186; 726/16–19
See application file for complete search history.

(56) References Cited

U.S. PATENT DOCUMENTS

| | | | |
|---|---|---|---|
| 7,516,325 B2 * | 4/2009 | Willey | 713/169 |
| 8,112,066 B2 * | 2/2012 | Ben Ayed | 455/411 |
| 8,494,576 B1 * | 7/2013 | Bye et al. | 455/550.1 |
| 8,694,436 B2 * | 4/2014 | Fisher | 705/64 |
| 8,831,514 B2 * | 9/2014 | Tysowski | 455/41.1 |
| 2012/0185697 A1 | 7/2012 | Buer | |
| 2013/0269026 A1 * | 10/2013 | Deluca | 726/19 |
| 2014/0181955 A1 * | 6/2014 | Rosati | 726/18 |

OTHER PUBLICATIONS

Yubico, "Technical Description," www.yubico.com/products/yubikey-hardware/yubikey-neo/technical-description/, 2013, 2 pages.
Hot for Security, "Android Key Fob Secures Online Authentication Via NFC," www.hotforsecurity.com/blog/android-key-fob-secures-online-authentication-via-nfc-3222.html, Jan. 2013, 4 pages.
Gluu, "USB & NFC Hard Token Authentication, Gluu Integrates YubiKey for Secure Hard Token Two-Factor Authentication," www.gluu.org/two-factor-authentication-security/yubikey/, 2013, 3 pages.

(Continued)

*Primary Examiner* — Amir Mehrmanesh
(74) *Attorney, Agent, or Firm* — Ryan, Mason & Lewis, LLP

(57) ABSTRACT

An apparatus comprises a processing device comprising a near field communication (NFC) network interface, a memory and a processor coupled to a memory. The processing device is configured under control of the processor to connect to a host device using the NFC network interface, receive an authentication request from another device through the NFC connection with the host device and authenticate the other device using information stored in the memory. A passcode is presented to the host device responsive to a successful authentication of the other device, the passcode being utilizable to authenticate to a resource protected by the other device.

24 Claims, 5 Drawing Sheets

(56) References Cited

OTHER PUBLICATIONS

Ideas Project, "NFC Authentication," https://ideasproject.com/idea/-/ideas/648113;jsessionid=DEE62C749EDCBC0F7F13EE3E149CFA, 2012, 4 pages.

Vijayakrishnan Pasupathinathan, "Hardware-Based Identification and Authentication Systems," Macquarie University, Faculty of Science, Thesis for the Degree of Doctor of Philosophy, Department of Computing, Dec. 2009, 204 pages.

* cited by examiner

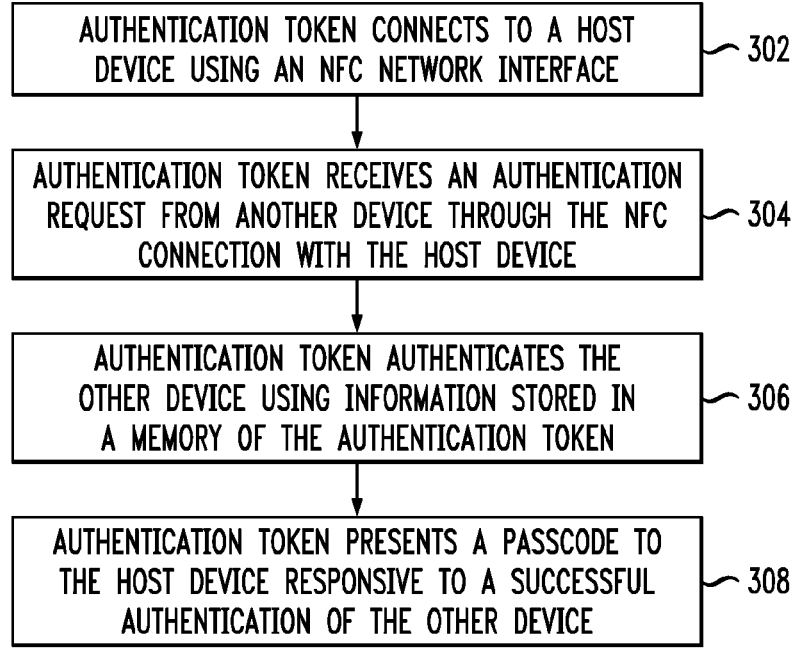
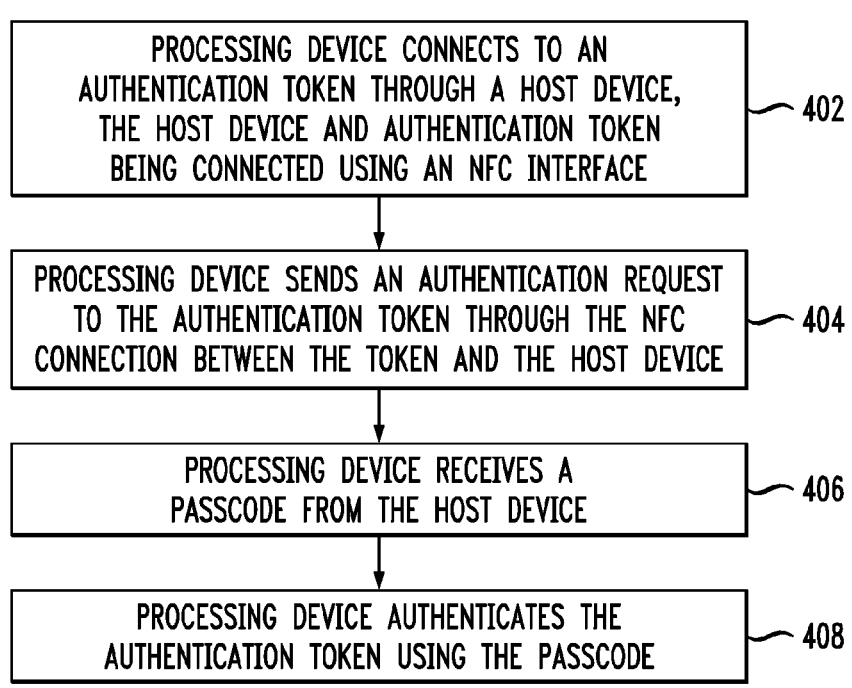

NEAR FIELD COMMUNICATION BASED AUTHENTICATION

FIELD

The present invention relates generally to cryptography, and more particularly to authenticators.

BACKGROUND

One-time passcode (OTP) authentication tokens may be implemented in hardware and software. Hardware authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password. Software authentication tokens, or software authenticators, can be implemented in the form of software installed on a processing device such as a computer, mobile phone, tablet, etc. Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In authentication tokens of this type, the passcodes are wirelessly communicated to a computer or other element of an authentication system. These wired or wireless arrangements, also referred to herein as connected tokens, save the user the trouble of reading the passcode from the display and manually entering it into the computer.

Hardware and software authentication tokens and other types of OTP devices are typically programmed with a random seed or other type of key that is also stored in a token record file. The record file is loaded into an authentication server, such that the server can create matching passcodes for the authentication token based on the key and the current time or current event count.

SUMMARY

Illustrative embodiments of the present invention provide authenticators with near field communication (NFC) capability.

In one embodiment, an apparatus comprises a processing device comprising an NFC network interface, a memory and a processor coupled to a memory. The processing device is configured under control of the processor to connect to a host device using the NFC network interface, receive an authentication request from another device through the NFC connection with the host device and authenticate the other device using information stored in the memory. A passcode is presented to the host device responsive to a successful authentication of the other device, the passcode being utilizable to authenticate to a resource protected by the other device.

In another embodiment, an apparatus comprises a first processing device comprising a network interface, a memory and a processor coupled to a memory. The first processing device is configured under control of the processor to connect to a second processing device through a host device, wherein the host device and the second processing device are connected using an NFC interface and send an authentication request to the second processing device through the NFC connection between the second processing device and the host device. A passcode is presented to the host device responsive to a successful authentication of the first processing device by the second processing device, the passcode being utilizable to authenticate to a resource protected by the first processing device.

These and other features and advantages of embodiments of the present invention will become more readily apparent from the accompanying drawings and the following detailed description.

BRIEF DESCRIPTION OF THE DRAWINGS

FIGS. 3-4 illustrate methodologies for authentication using NFC-enabled authentication tokens.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as encompass not only authentication tokens but also other types of devices that can be utilized for authenticating a device. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides functionality for facilitating secure authentication using NFC-enabled authentication tokens.

Many new computing devices such as mobile telephones and tablets are NFC-enabled. Such devices are typically equipped with NFC chipsets, antennas and protocols for facilitating NFC connections with other devices. Embodiments of the invention, as will be described in further detail below, utilize NFC-enabled authentication tokens which take advantage of various characteristics of NFC connections to ensure secure authentication of processing devices and cryptographic devices. For example, NFC-enabled authentication tokens may draw power from the NFC field of the connection between a token and a host device. As another example, NFC connections can support encryption and typically have a very short range (e.g., less than 10 cm), providing advantages relative to other wireless connections such as Bluetooth, WiFi, etc.

Figure 1:
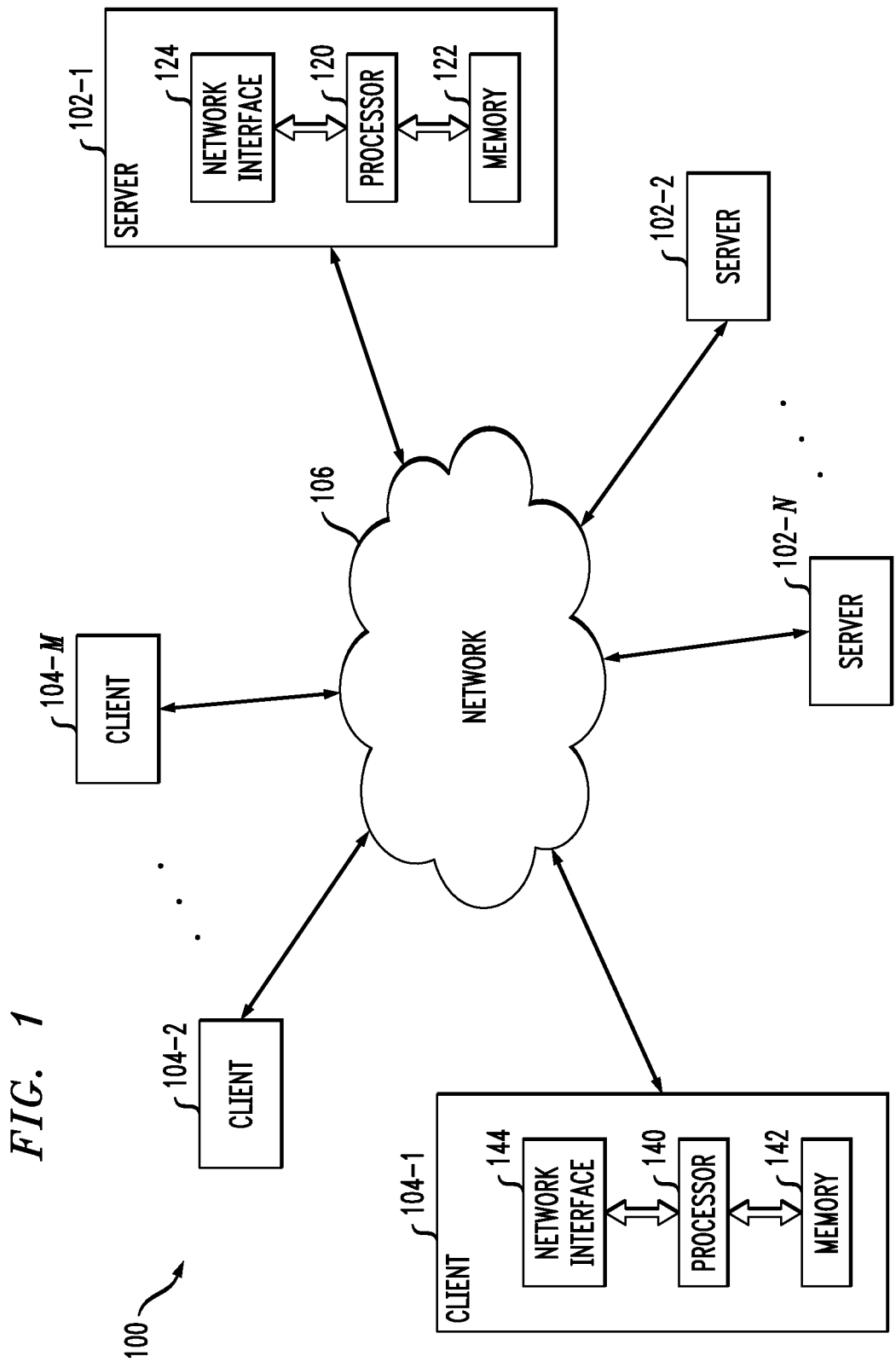
FIG. 1 is a block diagram of a communication system implementing NFC-enabled authentication in an illustrative embodiment of the invention.

FIG. 1 shows a communication system 100 that incorporates authentication functionality in an illustrative embodiment. The system 100 comprises a plurality of servers 102-1, 102-2, . . . 102-N that are configured to communicate with a plurality of clients 104-1, 104-2, . . . 104-M, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for authentication using NFC-enabled authentication tokens. An example of such a process performed at least in part in conjunction with a given one of the clients 104 authenticating to one or more of the servers 102 will be described in conjunction with FIG. 3, but it is to be appreciated that numerous other types of processes may be used in other embodiments.

A given one of the servers 102-1 in the present embodiment comprises a processor 120 coupled to a memory 122. The processor 120 may comprise a microprocessor, a microcontroller, an application-specific integrated circuit (ASIC), a field-programmable gate array (FPGA) or other type of processing circuitry, as well as portions or combinations of such circuitry elements. The memory 122 may comprise random access memory (RAM), read-only memory (ROM) or other types of memory, in any combination.

The memory 122 and other memories disclosed herein may be viewed as examples of what are more generally referred to as "computer program products" storing executable computer program code.

Also included in the server 102-1 is network interface circuitry 124. The network interface circuitry 124 allows the server 102-1 to communicate over the network 106 with the other servers 102 and with the clients 104, and may comprise one or more conventional transceivers.

The other servers 102 of the system 100 are assumed to be configured in a manner similar to that shown for server 102-1 in the figure.

A given one of the clients 104-1 in the present embodiment comprises a processor 140 coupled to a memory 142. The processor 140, like processor 120 in server 102, may comprise a microprocessor, a microcontroller, an ASIC, an FPGA or other type of processing circuitry, as well as portions or combinations of such circuitry elements, and the memory 142 may comprise RAM, ROM or other types of memory, in any combination.

Also included in the client 104-1 is network interface circuitry 144. The network interface circuitry 144 allows the client 104-1 to communicate over the network 106 with the servers 102 and with the other clients 104, and may comprise one or more conventional transceivers.

The other clients 104 of the system 100 are assumed to be configured in a manner similar to that shown for client 104-1 in the figure.

The servers 102 and clients 104 may include additional components not specifically illustrated in this figure but of a type commonly used in implementing authentication processes, as will be appreciated by those skilled in the art.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

It is to be appreciated that the particular set of elements shown in FIG. 1 in system 100 is presented by way of example, and in other embodiments additional or alternative elements may be used. Thus, another embodiment may include additional networks and additional sets of clients or servers.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

As noted above, in one or more of the illustrative embodiments, a first processing device or cryptographic device is an authentication token, and a second processing device or cryptographic device is an authentication server connected to the authentication token via a host device such as a personal computing device. It is important to note, however, that embodiments of the invention are not limited solely to arrangement in which an authentication token and authentication server authenticate to one another. In some embodiments, an authentication token and host device may authenticate to one another, in addition to or instead of the authentication token authenticating to an authentication server.

Figure 2:
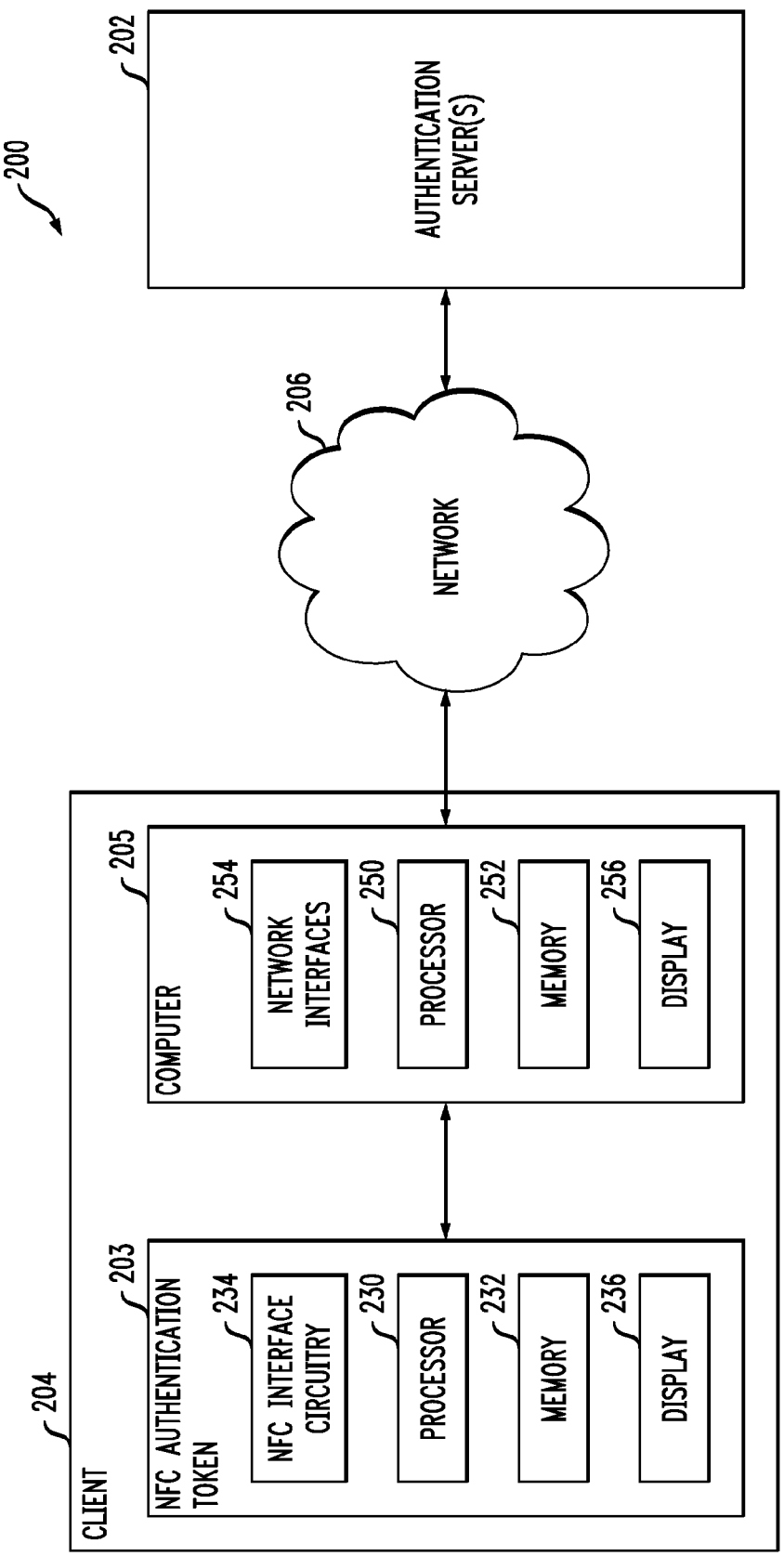
FIG. 2 shows one possible implementation of the FIG. 1 system including an NFC-enabled authentication token and an authentication server in an illustrative embodiment of the invention.

FIG. 2 shows an example of an authentication system 200 corresponding generally to an implementation of communication system 100. While FIG. 2 will be described below primarily in the context of one or more authentication servers 202 which authenticate a client 204 comprising an NFC-enabled authentication token 203, embodiments of the invention are not limited solely to this arrangement as described above.

Information from the NFC-enabled authentication token 203 is sent to a given authentication server 202 via network 206 and a host device that illustratively comprises a computer 205. As indicated previously, the term "cryptographic device" as used herein is intended to be broadly construed so as to encompass, for example, NFC-enabled authentication token 203 alone or in combination with at least a portion of the computer 205. An NFC-enabled authentication token may also be implemented using software, such that a first cryptographic device may comprise only computer 205, or another type of processing device, such as a mobile telephone. The NFC-enabled authentication token 203 may alternately exchange information with the computer 205 so as to authenticate the computer 205 in addition to or instead of authenticating the authentication server 202.

The NFC-enabled authentication token 203 comprises a processor 230, a memory 232 and NFC network interface circuitry 234. As indicated by the dashed outline in FIG. 2, NFC-enabled authentication token 203 may comprise a display 236. The display 236 may be any one of or a combination of display types, including a liquid crystal display (LCD), a light-emitting diode (LED) display, an electronic paper display, etc. It is important to note, however, that embodiments of the invention are not limited solely to NFC-enabled authentication tokens which comprise a display. Instead, as will be described in further detail below, NFC-enabled authentication tokens in various embodiments of the invention do not include or require a display.

The NFC-enabled authentication token 203 is configured to present OTPs or other passcodes to the computer 205 for use in authenticating to authentication server 202 or the computer 205 or another device. Such passcodes may be presented to a user via the display 236 of the token, such that the user can manually enter a given passcode into a user interface of computer 205 or another device. Alternatively, a given passcode may also be communicated directly from the NFC-enabled authentication token 203 to the computer 205 via an NFC network connection established using the NFC interface circuitry 234. The computer may forward the received passcode to the authentication server 202 or another device over the network 206, or may be output on a display 256 of the computer 205 or another device. While FIG. 2 shows NFC-enabled authentication token 203 configured to communicate with the computer 205 via an NFC network connection, the NFC-enabled authentication token 203 may comprise one or more other network interfaces such as a wired connection via a USB interface, or another wireless connection such as a Bluetooth or IEEE 802.11 connection in addition to the NFC network interface.

The NFC-enabled authentication token 203 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

As a more particular example, the NFC-enabled authentication token 203 may comprise a time-synchronous authentication token such as the above-noted RSA SecurID® user authentication token, suitably modified as disclosed herein.

In some embodiments, the NFC-enabled authentication token 203 may take the physical form of a very thin fob such as a keychain fob. The NFC-enabled authentication token 203 may alternatively take the physical form of an adhesive label or credit-card style form factor. One skilled in the art will readily appreciate that NFC-enabled authentication tokens may be embodied in a number of other physical form factors, including but not limited to a pen, a case for a computing device, etc.

The host device illustratively implemented as computer 205 in the FIG. 2 embodiment may comprise a desktop or portable personal computer, mobile telephone, personal digital assistant (PDA), wireless email device, workstation, kiosk, television set-top box, game console, or any other processing device that provides an interface between NFC-enabled authentication token 203 and a given authentication server 202.

As shown in the figure, the computer 205 generally comprises a processor 250, a memory 252, and one or more network interfaces 254 which allow the device to communicate with a given authentication server 202 over the network 206. The one or more network interfaces 254 include an NFC network interface which allows the computer 205 to communicate with the token 203 via an NFC connection. The computer 205 may also include a display 256, which may be any one of or combination of display types as discussed above.

It should also be noted that a given NFC-enabled authentication token need not take the form of a stand-alone hardware token. For example, such a device may be incorporated into another processing device, such as a computer, mobile telephone, a USB stick, etc. In one such implementation, the host device and the NFC-enabled authentication token may be combined into a single processing device that communicates with the authentication server.

In the system 200, the authentication server 202 is configured as a back-end authentication server, in that it communicates with computer 205 over a network, but other types of authentication servers may be used.

A wide variety of authentication processes may be implemented using an NFC-enabled authentication token 203, a host device such as computer 205 and a set of one or more authentication servers 202 arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of NFC-enabled and other authentication tokens, host devices and sets of one or more authentication servers, and possibly other system components, although only single instances of illustrative examples of such components are shown in the simplified system diagram of FIG. 2 for clarity of illustration. Also, as indicated previously, other embodiments may combine certain system elements, such as an authentication token and a host device. It is also possible to eliminate, modify or replace other system elements. For example, NFC-enabled authentication token 203 may communicate directly with authentication server 202, rather than via other elements such as computer 205 and network 206.

FIG. 3 illustrates a methodology 300 for authentication using an NFC-enabled authentication token. The authentication token connects 302 to a host device using an NFC network interface. While methodology 300 describes a computer acting as a host device, embodiments of the invention are not limited solely to use with computers. Instead, as described above, various other computing and processing devices may act as host devices, including mobile telephones, tablets, etc.

The authentication token receives 304 an authentication request from another device through the NFC connection with the host device. As described above, the other device may be an authentication server or the host device itself. One skilled in the art will readily appreciate that the authentication request may originate in various devices. The authentication token authenticates 306 the other device using information stored in a memory of the authentication token. Responsive to a successful authentication, the authentication token presents 308 a passcode to the host device. The passcode may be presented to the host device in a number of ways. For example, the authentication token may comprise its own display, and the passcode may be output on the display such that a user of the host device can read and obtain the passcode. Alternatively, presenting the passcode to the host device may involve the passcode being transmitted from the token to the host device over the NFC connection for output on a display of the host device or for transmittal to the other device.

While FIG. 3 illustrates a methodology wherein the passcode is passed from the authentication token to the host device, embodiments of the invention are not limited solely to this arrangement. In other embodiments, the passcode may be presented to the host device from the other device.

The passcode is utilizable for authenticating to a resource protected by the other device. The resource may be a variety of protected resources. For example, the resource may comprise a web portal for accessing a particular web page or web site. As another example, the resource may be a feature or function on a particular device, a file or folder stored on a device etc. As will be appreciated by one skilled in the art, the passcode may be utilized to authenticate to or access a wide variety of resources and resource types.

The authentication token and the other device may establish mutual trust with one another using a variety of techniques, including but not limited to challenge/response techniques.

FIG. 4 illustrates a methodology 400 for authentication using NFC-enabled authentication tokens from the perspective of the other device referred to in FIG. 3. The processing device, referred to as the other device in FIG. 3, connects 402 to the authentication token through a host device. The authentication token and host device are connected using an NFC interface. While FIG. 4 refers to a processing device and a host device separately, it is important to note that in some embodiments the processing device and the host device may be the same, or the host device may be incorporated within the processing device. The processing device sends 404 an authentication request to the authentication token through the NFC connection between the token and the host device. The processing device receives 406 a passcode from the host device, and authenticates 408 the authentication token using the passcode.

The passcode referred to in FIGS. 3 and 4 may be obtained, generated or retrieved using a variety of techniques described above and to be described below. Various techniques will be described below in the context of authentication between an NFC-enabled authentication token and an authentication server acting as the other device referred to in FIG. 3. As described above, however, embodiments of the invention are not limited solely to authentication between NFC-enabled authentication tokens and authentication servers.

As described above, NFC-enabled authentication tokens may be time-synchronous authentication tokens or event-synchronous authentication tokens. Time-synchronous NFC-enabled authentication tokens may generate OTPs using a seed value and time base component indicative of a current time. The NFC-enabled authentication token may use an internal clock or timing circuitry to obtain the time base component. To reduce the complexity and power requirements for the authentication token, the time base component may alternatively be retrieved from the host device or in a message from the authentication server. Event-synchronous NFC-enabled authentication tokens may generate OTPs using a seed value and an event base component indicative of a current event counter.

In some embodiments, the authentication token and authentication server may mutually authenticate to one another using a challenge/response authentication or other types of message exchange including the exchange of unlock codes. In other embodiments, one-way authentication may be utilized. After the authentication token and the authentication server establish one-way or mutual authentication, the authentication server can send a message to the authentication token. The message may comprise the passcode, an encrypted passcode, a' compressed passcode, an encrypted and compressed passcode, etc. The authentication token may use information stored in the memory to decrypt or decompress the received passcode.

In other embodiments, the authentication server may send a message including information other than the passcode which the authentication token utilizes for determining, computing or otherwise retrieving a passcode. As an example, the authentication token may store a set of passcodes and corresponding addresses in a memory. The authentication token may receive a message from the authentication server, in conjunction with the authentication request or otherwise, which specifies a particular address of the memory. The authentication token can look up and retrieve a passcode corresponding to the particular address in the message. The passcode may be provided after successful authentication of the requesting device such as the authentication server.

The corresponding addresses may by physical addresses of the memory. If the passcodes are pre-computed and stored in a memory of the authentication token, the authentication server has knowledge of the passcodes which are stored at particular physical addresses of the authentication token. Thus, the authentication server can authenticate the authentication token if the passcode received from the authentication token via the host device matches an expected passcode for the particular physical address.

As described above, the authentication token may derive its power solely from the NFC field of the NFC connection between the authentication token and the host device such that the authentication token need not comprise any other power source. The set of passcodes and corresponding addresses may come pre-loaded in a memory of the authentication token. This advantageously reduces the complexity of operations and processing which must be performed on the authentication token. The set of passcodes may be encrypted or compressed to save space.

Once the authentication server, host device, or other device is authenticated to the authentication token, these devices may dynamically update or otherwise refresh information stored in a memory of the authentication token. For example, the set of passcodes and corresponding addresses described above may be updated or refreshed periodically or on request from a user or other entity. Similarly, information stored in the memory of the NFC-enabled authentication token described below with respect to other authentication techniques and processes may also be dynamically updated or otherwise refreshed.

In some embodiments, an authentication token may store in a memory a series of digits and/or alphanumeric characters. The authentication token may receive a message from the authentication server, in conjunction with the authentication request or otherwise, which includes a query for a particular sequence or particular ones of the digits or alphanumeric characters stored in the memory. The query may comprise a randomized look-up with a starting index. The authentication server may keep track of which characters have been queried from the memory of a given authentication token to ensure that the same characters are not re-used. Alternatively, queries may be designed to re-use one or more characters or digits specified in previous queries.

The randomized look-up query may specify a continuous or non-continuous series or sequence of digits and alphanumeric characters stored in the memory of the authentication token. For example, the query may specify a random starting index number and specify that the series of digits and/or alphanumeric characters should include the digit or alphanumeric character at the starting index number and at each xth index after the starting index number. As another example, the query may specify the random starting index number and specify that the series comprise the digit or alphanumeric character at the starting index number and the next y indexes, or the next y indexes except the zth index after the starting index number. One skilled in the art will readily appreciate that various other queries may be used in embodiments of the invention.

The authentication token uses the look-up index in the message to retrieve a series of digits and/or alphanumeric characters. The authentication token presents the series of digits and/or alphanumeric characters to the host device, either by displaying the series of digits and/or alphanumeric characters on a display of the authentication token or sending the series of digits and/or alphanumeric characters to the host device for output on a display of the host device. A user can then enter the series of digits and/or alphanumeric characters to authenticate to the authentication server. The authentication token may alternately send the series of digits and/or alphanumeric characters to the authentication server via the host device without requiring a user to manually input the series of digits and/or alphanumeric characters.

The authentication server may alternatively request other authentication information in addition to the passcode to perform two-factor or multi-factor authentication. For example, the two-factor authentication process may require the user to input a personal identification number (PIN) or other value in conjunction with the passcode. In other embodiments, various biometric values may be utilized in a two-factor authentication process, including but not limited to fingerprint scans, retina scans, facial recognition, voice recognition, etc.

As described above, the use of NFC-enabled authentication tokens provides a number of significant advantages. NFC-enabled authentication tokens may be designed in a manner which does not require the tokens to have a battery or other power source. Instead, a given NFC-enabled authentication token may use an NFC field to power itself. These implementations of NFC-enabled authentication tokens will typically have limited processing power, and thus embodiments of the invention may utilize encryption and authentication techniques which do not require significant processing power. In several embodiments described herein, the authentication token can perform an authentication process utilizing simple calculations such as memory look-ups.

In addition, NFC-enabled authentication tokens may be embodied in very small physical devices, such as thin fobs, cards or adhesive labels which may be affixed to a host device such as a mobile telephone or tablet, or to a case for the mobile telephone, tablet or other host device. Such NFC-enabled authentication tokens will not significantly increase the size of a host device, which is important for host devices such as mobile telephones and tablets. Mobile telephones and tablets are typically designed to be as thin and lightweight as possible. The use of very thin, lightweight and unobtrusive NFC-enabled authentication tokens for such devices is particularly advantageous from an aesthetic perspective.

NFC-enabled authentication tokens can also leverage the short-range of NFC-based network connections for improved security. As discussed above, the typical range for NFC-based network connections is 10 cm or less. Thus, NFC-enabled authentication tokens must be in close proximity to a host device during authentication, providing an advantage relative to authentication tokens which use other wireless connections such as WiFi or Bluetooth to connect to a host device. It is important to note that NFC-enabled authentication tokens in embodiments of the invention may be configured with a particular range for NFC connections depending on an expected use or the form factor of the token. In some embodiments NFC-enabled authentication tokens may be configured such that the range for the NFC connection is less or much less than 10 cm for improved security or greater or much greater than 10 cm for user convenience.

The particular range of the NFC connection for a given NFC-enabled authentication token may be configured based on a physical embodiment of the given authentication token. For example, an NFC-enabled authentication token embodied in an adhesive label which is affixed to a host device may be configured such that the range for the NFC connection is only a few centimeters or less than a centimeter. As another example, an NFC-enabled authentication token embodied in a thin key fob may be configured such that the range for the NFC connection is greater than 10 cm, as a user may keep a keychain holding the key fob in their pocket while holding the host device such as a mobile telephone in his or her hand.

Figure 5:
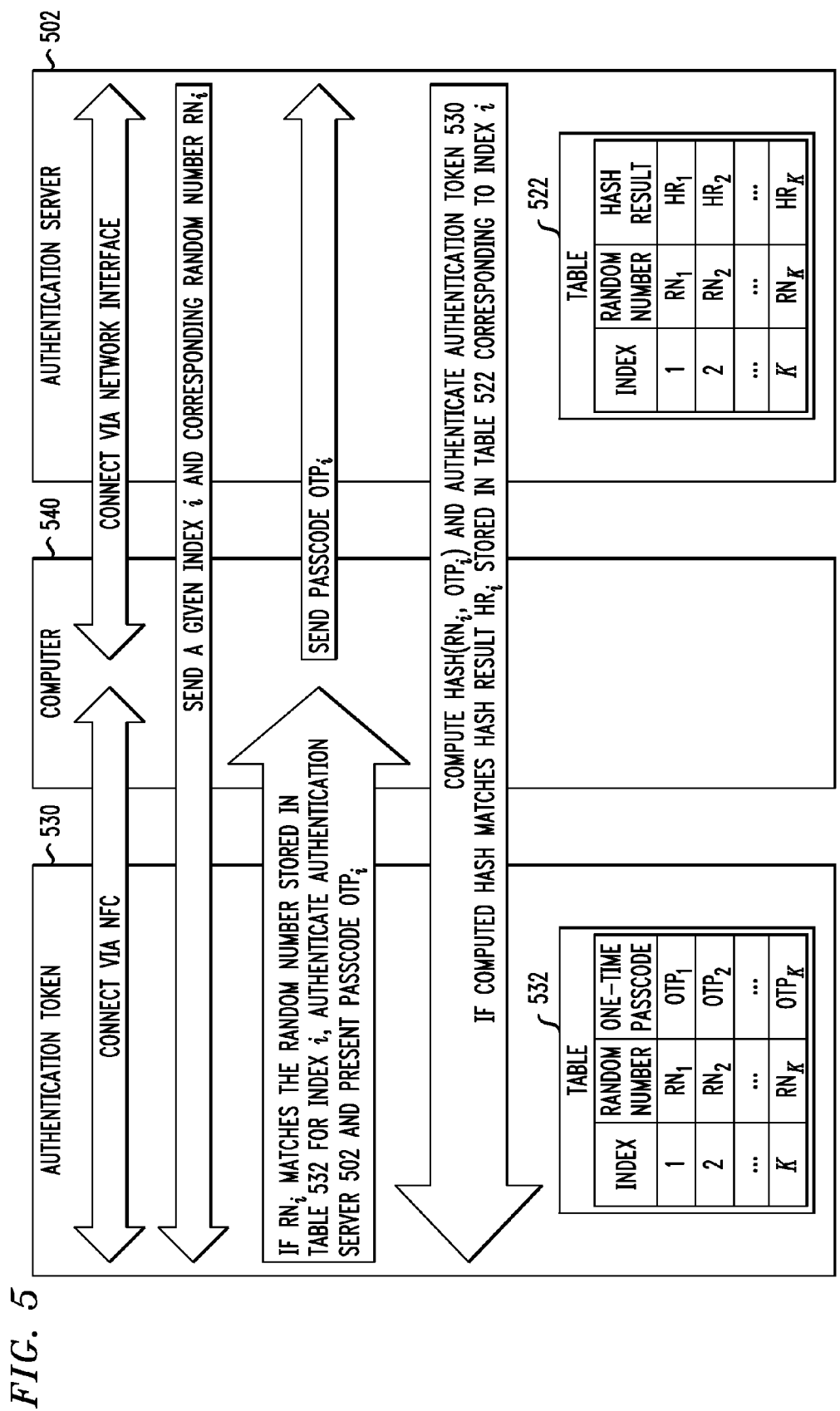
FIG. 5 illustrates an authentication process, according to an embodiment of the invention.

FIG. 5 illustrates an authentication process between an authentication token 530, a computer 540 acting as a host device for the authentication token 530, and an authentication server 502. The authentication process begins with establishing an NFC connection between the authentication token 530 and the computer 540, and establishing another network connection between the computer 540 and the authentication server 502. The network connection between the computer 540 and the authentication server 502 may be a wired or wireless connection. In FIG. 5, the authentication token 530 comprises a table 532 comprising K entries. The table 532 is stored in a memory of the authentication token 530. The authentication server 502 comprises a table 522 also comprising K entries. The table 532 stores K random numbers denoted $RN_1$ to $RN_K$ and K corresponding unique OTPs denoted $OTP_1$ to $OTP_K$. It is important to note that although table 532 utilizes passcodes which are OTPs, other types of passcodes may be used in other embodiments. The table 522 stores the K random numbers $RN_1$ to $RN_K$ and K corresponding hash results denote $HR_1$ to $HR_K$. The hash results $HR_1$ to $HR_K$ are the results of a hashing function applied to the K corresponding random numbers $RN_1$ to $RN_K$ and OTPs $OTP_1$ to $OTP_K$.

The number of entries K in tables 522 and 532 may vary depending on an expected use or application. As K increases, the number of unique passcodes stored in a given authentication token also increases. As the number of unique passcodes increases, a corresponding likelihood that an adversary will be able to randomly guess a given passcode decreases. For example, in some embodiments the number of entries K is approximately one million. The random numbers comprise 256-bit numbers, and the OTPs comprise 6-digit numbers, such that there is a one in a million chance of guessing a correct OTP in a given authentication process to be described below.

After the connections between the authentication token 530, computer 540 and authentication server 502 are established, the authentication server 502 will send a given index number i and a corresponding random number $RN_i$ selected from table 522 to the authentication token 530. The index i may be selected randomly by the authentication server 502, or may be selected according to a pre-defined pattern.

The authentication token 530 will look up the index i in table 532 and determine whether the received $RN_i$ matches the random number $RN_i$ in table 532 for index i. If the received $RN_i$ matches, the authentication token 430 authenticates the authentication server 502 and presents the passcode $OTP_i$ to the computer 540. The computer 540 sends the passcode $OTP_i$ to the authentication server 502. The authentication server 502 will compute a hash using $RN_i$ and the received $OTP_i$ to determine a hash result. Embodiments of the invention may use various hashing functions. For example, if the random numbers are 256-bit numbers, the authentication server may use the SHA256 cryptographic hashing function developed by the National Institute of Standards and Technology (NIST). Various other hashing functions may be used, including other cryptographic hashing functions in the SHA-2 set designed by the NIST for other size random numbers. The authentication server 502 will compare the computed hash result with the hash result $HR_i$ in table 522. If the computed hash result and $HR_i$ match, the authentication server 502 authenticates the authentication token 530.

Figure 6:
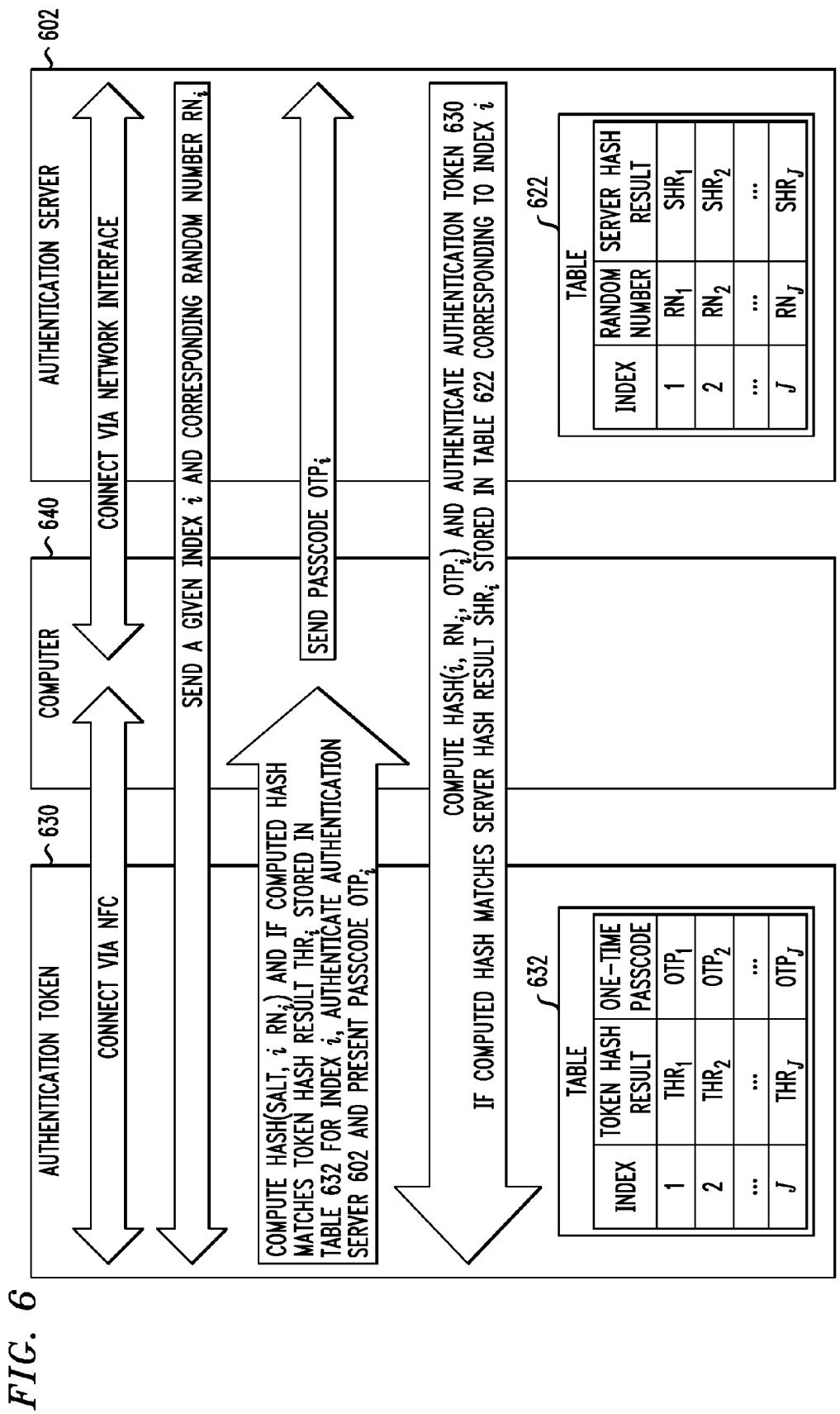
FIG. 6 illustrates another authentication process, according to an embodiment of the invention.

FIG. 6 illustrates another authentication process between an authentication token 630, a computer 640 acting as a host device for the authentication token 630, and an authentication server 602. The authentication process begins with establishing an NFC connection between the authentication token 630 and the computer 640, and establishing another network connection between the computer 640 and the authentication server 602. The network connection between the computer 640 and the authentication server 602 may be a wired or wireless connection.

In FIG. 6, the authentication token 630 comprises a table 632 comprising J entries. The table 632 is stored in a memory of the authentication token 630. The authentication server 602 comprises a table 622 also comprising J entries. The table 632 stores J token hash results denoted $THR_1$ to $THR_J$ and J corresponding unique OTPs denoted $OTP_1$ to $OTP_J$. The token hash results $THR_1$ to $THR_J$ are the results of a hashing function applied to a device salt and corresponding indexes J and random numbers $RN_1$ to $RN_J$. It is important to note that although table 632 utilizes passcodes which are OTPs, other types of passcodes may be utilized in other embodiments. The table 622 stores J random numbers $RN_1$ to $RN_J$ and J corresponding server hash results denote $SHR_1$ to $SHR_J$. The server hash results $SHR_1$ to $SHR_J$ are the results of a hashing function applied to indexes J and corresponding random numbers $RN_1$ to $RN_J$ and OTPs $OTP_1$ to $OTP_J$.

After the connections between the authentication token 630, computer 640 and authentication server 602 are established, the authentication server 602 will send a given index number i and a corresponding random number $RN_i$ selected from table 622 to the authentication token 630. The index i may be selected randomly by the authentication server 602, or may be selected according to a pre-defined pattern.

The authentication token 630 computes a hashing function using the received index i, the received random number $RN_i$ and the device salt. The authentication token 630 compares this computed hash result with the token hash result $THR_i$ stored in table 632 for index i. If the computed hash result and the token hash result $THR_i$ match, the authentication token 630 authenticates the authentication server 602 and presents the passcode $OTP_i$ for index i to computer 640. The computer 640 sends the passcode $OTP_i$ to the authentication server 602. The authentication server computes a hashing function using the index i, the random number $RN_i$ and the received passcode $OTP_i$. The authentication server 602 compares the computed hash result with the server hash result $SHR_i$ in table 622 for index i. If the computed hash result and the server hash result $SHR_i$ match, the authentication server 602 authenticates the authentication token 630.

The hashing functions described above with respect to FIG. 6 may be various types of hashing functions. As an example, if the random numbers are 256-bit numbers, the authentication server may use the SHA256 cryptographic hashing function developed by the NIST. Various other hashing functions may be used, including other cryptographic hashing functions in the SHA-2 set designed by the NIST for other size random numbers.

The particular processing operations and other system functionality described in conjunction with the flow diagrams of FIGS. 3-6 are presented by way of illustrative example only, and should not be construed as limiting the scope of the invention in any way. Alternative embodiments can use other types of processing operations for authentication. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different authentication techniques.

It is to be appreciated that the authentication and other processing functionality such as that described in conjunction with the flow diagrams of FIGS. 3-6 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

It is to be appreciated that the particular configuration, elements and operating parameters of the embodiments described above are not requirements of the invention, and should not be construed as limiting the scope of the invention in any way. For example, while FIGS. 5 and 6 show authentication processes between an NFC-enabled authentication token and an authentication server initiating an authentication request, these authentication processes may also be carried out between the NFC-enabled authentication token and a host device which initiates an authentication request. As another example, while tables 532 and 632 in FIGS. 5 and 6 contain K and J unique OTPs, respectively, in other embodiments OTPs for two or more entries in the table may match one another. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a processing device comprising:
a near field communication (NFC) network interface;
a memory; and
a processor coupled to the memory;
the processing device being configured under control of the processor to:
connect to a host device using the NFC network interface;
receive an authentication request from another device through the NFC connection with the host device; and
authenticate the other device using information stored in the memory;
wherein a passcode is presented to the host device responsive to a successful authentication of the other device;
wherein the passcode is used by the host device to authenticate to a resource protected by the other device; and
wherein the processing device is further configured to:
store in the memory a set of passcodes and corresponding addresses;
receive at least one message from the other device specifying an address; and
retrieve a passcode corresponding to the specified address from the memory, the retrieved passcode being the passcode presented to the host device.

2. The apparatus of claim 1 wherein the processing device comprises an authentication token, the other device comprises an authentication server and the host device comprises a personal computing device.

3. The apparatus of claim 1, wherein the processing device comprises an authentication token and the other device is the host device, the host device comprising a personal computing device.

4. The apparatus of claim 1, wherein the processing device is embodied in one of an adhesive label, a keychain fob and a card.

5. The apparatus of claim 1, wherein:
the processing device is configured to store the set of passcodes and corresponding addresses in the memory as an alphanumeric sequence of digits;
the specified address in the message from the other device comprises a query indicating a starting index of the alphanumeric sequence and one or more digits in the alphanumeric sequence following the starting index; and
the processing device is configured to retrieve the passcode corresponding to the specified address from the memory by concatenating a series of alphanumeric digits specified in the query.

6. The apparatus of claim 1, wherein the specified address comprises a physical address of the memory.

7. The apparatus of claim 1, wherein:
the processing device is configured to store the set of passcodes and corresponding addresses in the memory by storing a set of index values and corresponding pairs of random numbers and passcodes;
the message from the other device comprises a given one of the random numbers and the specified address comprises a given one of the index values; and
the processing device under control of the processor is further configured to authenticate the other device by determining whether the given random number matches a random number stored in the memory corresponding to the given index number.

8. The apparatus of claim 7, wherein the corresponding pairs of random numbers and passcodes comprise each comprise respective 256-bit random numbers and 6-digit one-time passcode (OTP) values.

9. The apparatus of claim 1, wherein:
the processing device is configured to store the set of passcodes and corresponding addresses in the memory by storing a device-specific salt, a set of index values and corresponding pairs of hash values and passcodes;
the message from the other device comprises a given one of the random numbers and the specified address comprises a given one of the index values; and
the processing device under control of the processor is further configured to authenticate the other device by:
computing a hash result based on the given index number, the given random number and the device-specific salt; and
determining if the computed hash result matches the stored hash value corresponding to the given index number.

10. The apparatus of claim 9, wherein the given random number comprises a 256-bit random number and computing the hash result comprises computing a SHA256 function.

11. The apparatus of claim 1, wherein the processing device is configured under control of the processor to authenticate the other device using a challenge/response authentication protocol.

12. The apparatus of claim 1, wherein the passcode is utilized with a personal identification number (PIN) or biometric identification to authenticate to the resource.

13. A method comprising:
connecting a processing device to a host device using a near field communication (NFC) network interface;
receiving an authentication request from another device through the NFC connection with the host device; and
authenticating the other device using information stored in a memory of the processing device;
wherein a passcode is presented to the host device responsive to a successful authentication of the other device;
wherein the passcode is used by the host device to authenticate to a resource protected by the other device;
wherein the memory of the processing devices stores a set of passcodes and corresponding addresses; and
further comprising receiving at least one message from the other device specifying an address of the memory and retrieving a passcode corresponding to the specified address from the memory, the retrieved passcode being the passcode presented to the host device.

14. A non-transitory processor-readable storage medium having instruction code embodied therein which when executed by a processor implements the steps of the method of claim 13.

15. The method of claim 13, wherein the specified address comprises a physical address of the memory of the processing device.

16. The method of claim 13, wherein:
the memory of the processing devices stores the set of passcodes and corresponding addresses as an alphanumeric sequence;
the specified address comprises a query indicating a starting index of the alphanumeric sequence and one or more digits in the alphanumeric sequence following the starting index; and
the passcode is retrieved from the memory of the processing device by concatenating a series of alphanumeric digits specified in the query.

17. An apparatus comprising:
a first processing device comprising:
a network interface;
a first memory; and
a processor coupled to the first memory;
the first processing device being configured under control of the processor to:
connect to a second processing device through a host device, wherein the host device and the second processing device are connected using a near field communication (NFC) interface; and
send an authentication request to the second processing device through the NFC connection between the second processing device and the host device;
wherein a passcode is presented to the host device responsive to a successful authentication of the first processing device by the second processing device;
wherein the passcode is used by the host device to authenticate to a resource protected by the first processing device;
wherein the first processing device is configured with knowledge of a set of passcodes and corresponding addresses stored in a second memory of the second processing device; and
wherein the first processing device is configured to send a message to the second processing device specifying an address of the second memory, the passcode presented to the host device comprising a passcode retrieved from the second memory corresponding to the specified address.

18. The apparatus of claim 17, wherein the first processing device comprises an authentication server, the second processing device comprises an authentication token and the host device comprises a personal computing device.

19. The apparatus of claim 17, wherein the first processing device is a personal computing device comprising the host device and the second processing device comprises an authentication token.

20. The apparatus of claim 17, wherein:
the first processing device is configured to store in the first memory a set of index values and corresponding pairs of random numbers and hash values;
the message sent to the second processing device comprises a given one of the index values and a given one of the random numbers; and
the first processing device under control of the processor is configured to authenticate the second processing device by:
computing a hash result based on the given random number and a passcode received from the host device; and
determining if the computed hash result matches the stored hash value corresponding to the given index number.

21. The apparatus of claim 17, wherein the specified address comprises a physical address of the second memory.

22. A method comprising:
connecting a first processing device to a second processing device through a host device, wherein the host device and the second processing device are connected using a near field communication (NFC) interface; and
sending an authentication request to the second processing device through the NFC connection between the second processing device and the host device;
wherein a passcode is presented to the host device responsive to a successful authentication of the first processing device by the second processing device;
wherein the passcode is used by the host device to authenticate to a resource protected by the first processing device;
wherein the first processing device is configured with knowledge of a set of passcodes and corresponding address stored in a memory of the second processing device; and
further comprising sending at least one message to the second processing device specifying an address of the memory, the passcode presented to the host device comprising a passcode retrieved from the memory of the second processing device corresponding to the specified address.

23. A non-transitory processor-readable storage medium having instruction code embodied therein which when executed by a processor implements the steps of the method of claim 22.

24. The method of claim 22, wherein the specified address comprises a physical address of the memory of the second processing device.

* * * * *